US009348472B2

(12) United States Patent
Kang et al.

(10) Patent No.: US 9,348,472 B2
(45) Date of Patent: May 24, 2016

(54) TOUCH SCREEN DRIVER AND METHOD FOR DRIVING TOUCH SCREEN

(71) Applicant: LG Display Co., Ltd., Seoul (KR)

(72) Inventors: Hyeongwon Kang, Seoul (KR); Beomjin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 89 days.

(21) Appl. No.: 14/096,013

(22) Filed: Dec. 4, 2013

(65) Prior Publication Data

US 2014/0168148 A1 Jun. 19, 2014

(30) Foreign Application Priority Data

Dec. 14, 2012 (KR) ........................ 10-2012-0146816

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ...... G06F 3/0418; G06F 3/044; G06F 3/0416
USPC .......................................................... 345/174
See application file for complete search history.

(56) References Cited

U.S. PATENT DOCUMENTS

2007/0074913 A1* 4/2007 Geaghan et al. ........... 178/18.06

\* cited by examiner

*Primary Examiner* — Mark Regn
(74) *Attorney, Agent, or Firm* — Morgan, Lewis & Bockius LLP

(57) ABSTRACT

A touch screen driver includes a touch screen including Tx channels, Rx channels crossing the Tx channels, and sensor nodes formed at crossings of the Tx channels and the Rx channels, a Tx driving circuit supplying a driving pulse to the Tx channels, an Rx driving circuit which samples voltages of the sensor nodes supplied through the Rx channels in response to Rx sampling clocks and converts the sampled voltages into digital data, and a touch controller which modulates the Rx sampling clocks based on an RC delay deviation between the Rx channels, supplies the modulated Rx sampling clocks to the Rx driving circuit, differently controls sampling times of the Rx channels, and analyzes the digital data using a previously determined touch recognition algorithm.

6 Claims, 12 Drawing Sheets

9,348,472 B2

TOUCH SCREEN DRIVER AND METHOD FOR DRIVING TOUCH SCREEN

This application claims the benefit of Korean Patent Application No. 10-2012-0146816 filed on Dec. 14, 2012, which is incorporated herein by reference for all purposes as if fully set forth herein.

BACKGROUND OF THE INVENTION

1. Field of the Invention

Embodiments of the invention relate to a touch screen driver and a method for driving a touch screen.

2. Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technologies have continuously expanded to increase user's sensibility and handling convenience. The user interface has been recently developed to include touch UI, voice recognition UI, 3D UI, etc.

In recent, the touch UI has been used in portable information appliances and has been expanded to the use of home appliances. A mutual capacitive touch screen has been recently considered as an example of a touch screen for implementing the touch UI. The mutual capacitive touch screen can sense the proximity input as well as the touch input and also recognize respective multi-touch (or multi-proximity) inputs.

The mutual capacitive touch screen includes Tx lines, Rx lines crossing the Tx lines, and sensor nodes formed at crossings of the Tx lines and the Rx lines. Each of the sensor nodes has a mutual capacitance. A touch screen driver senses changes in the voltages charged to the sensor nodes before and after a touch operation and determines a touch (or proximity) position of a conductive material. To sense the voltages charged to the sensor nodes, a Tx driving circuit applies a driving pulse to the Tx lines, and an Rx driving circuit samples a small change in the voltages of the sensor nodes in synchronization with the driving pulse and performs the analog-to-digital conversion.

The Tx lines and the Rx lines of the touch screen are generally routed on a flexible printed circuit board (FPCB) and are connected to a touch integrated circuit (IC), and thus Rx channels have different RC delays. Because the driving pulse applied to the Tx lines is noisy and the Rx channels have the different RC delays, each of input signals (for example, the voltages of the sensor nodes) input to a sampling circuit has a different transition time. The transition time is a time at which the input signal changes from a transition state to a saturation state (i.e., at which the input signal is in a maximum charge state).

In FIG. 1, 't0', 't1', 't2', and 't3' denote a transition time of an Rx channel RX0, a transition time of an Rx channel RX1, a transition time of an Rx channel RX2, and a transition time of an Rx channel RX3, respectively. The transition times t0, t1, t2, and t3 are different from one another. Thus, as shown in FIG. 1, when the Rx channels RX0 to RX3 are simultaneously sampled, a sampling deviation is generated in the Rx channels RX0 to RX3. Namely, as shown in FIG. 1, when the same sampling time is applied to all of the Rx channels RX0 to RX3 using Rx sampling clocks SRx0 to SRx3, which are simultaneously generated with the same width, it is difficult to accurately detect a touch signal. Further, a signal-to-noise ratio (abbreviated to SNR) is entirely reduced because of an output noise.

SUMMARY OF THE INVENTION

Embodiments of the invention provide a touch screen driver and a method for driving a touch screen capable of accurately detecting a touch signal and increasing a signal-to-noise ratio by differently controlling sampling times of channels based on a RC delay deviation between the channels.

In one aspect, there is a touch screen driver comprising a touch screen including Tx channels, Rx channels crossing the Tx channels, and sensor nodes formed at crossings of the Tx channels and the Rx channels, a Tx driving circuit configured to supply a driving pulse to the Tx channels, an Rx driving circuit configured to sample voltages of the sensor nodes supplied through the Rx channels in response to Rx sampling clocks and convert the sampled voltages of the sensor nodes into digital data, and a touch controller configured to modulate the Rx sampling clocks based on an RC delay deviation between the Rx channels, supply the modulated Rx sampling clocks to the Rx driving circuit, differently control sampling times of the Rx channels, analyze the digital data received from the Rx driving circuit using a previously determined touch recognition algorithm, and output touch data including coordinate information of a touch position.

In another aspect, there is a method for driving a touch screen including Tx channels, Rx channels crossing the Tx channels, and sensor nodes formed at crossings of the Tx channels and the Rx channels, the method comprising supplying a driving pulse to the Tx channels, modulating Rx sampling clocks so as to differently control sampling times of the Rx channels based on an RC delay deviation between the Rx channels, sampling voltages of the sensor nodes supplied through the Rx channels in response to the Rx sampling clocks and converting the sampled voltages of the sensor nodes into digital data, and analyzing the digital data using a previously determined touch recognition algorithm to output touch data including coordinate information of a touch position.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. In the following description, a Tx line may be used as a Tx channel, and an Rx line may be used as an Rx channel.

Figure 1:
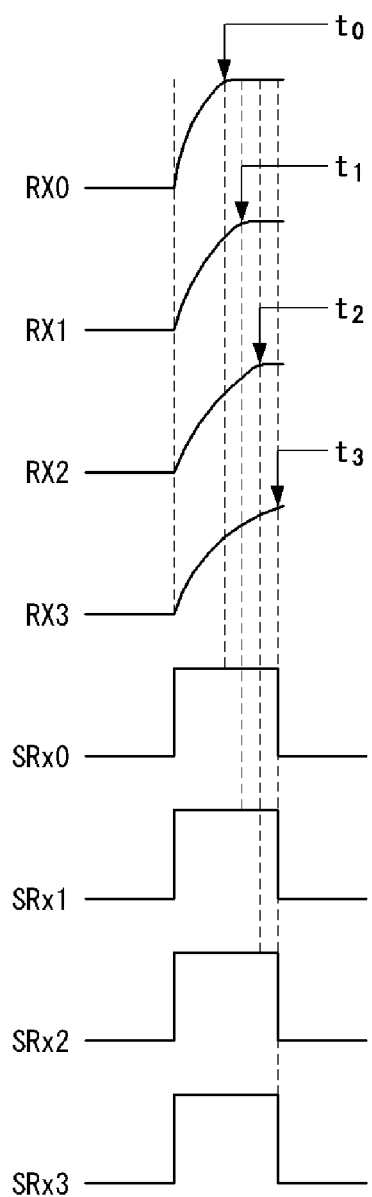
FIG. 1 illustrates different transition times of channels resulting from a RC delay deviation between the channels.
Figure 2:
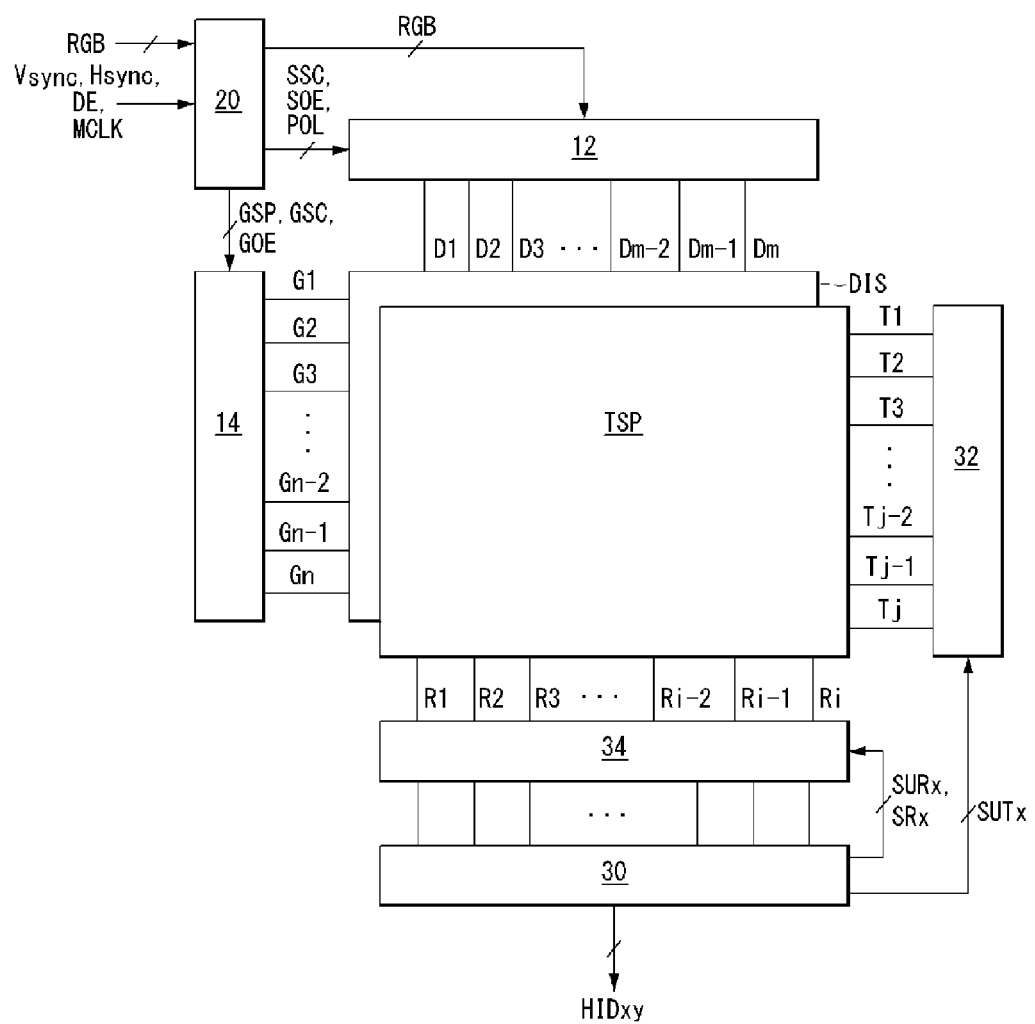
FIG. 2 is a block diagram of a display device according to an example embodiment of the invention.
Figure 3:
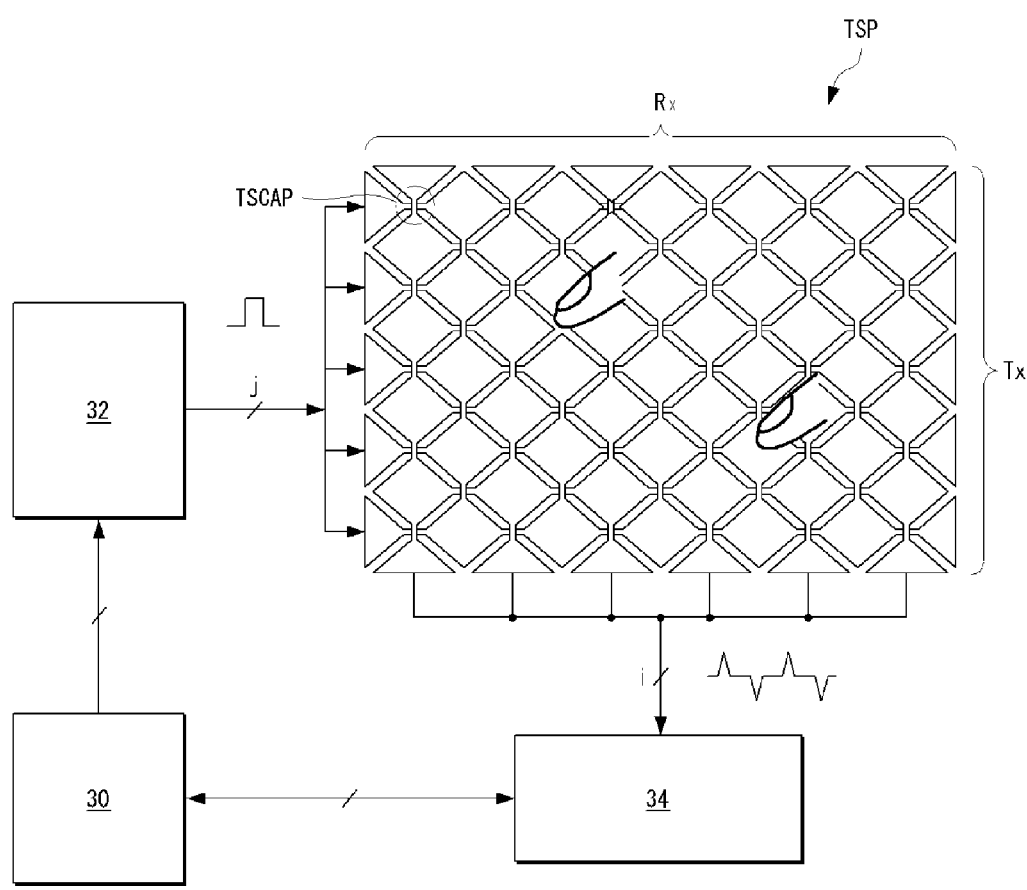
FIG. 3 illustrates a touch screen driver shown in FIG. 2.
Figure 4:
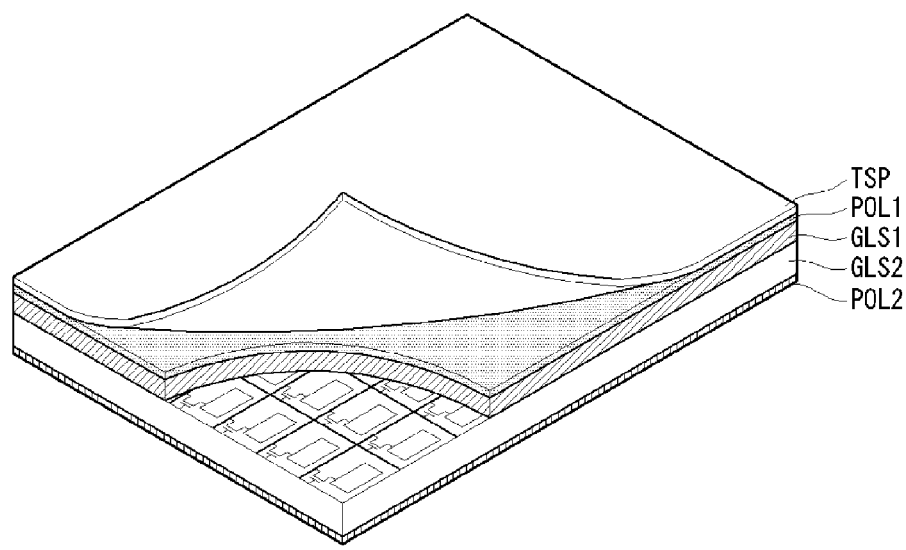
FIGS. 4 to 6 illustrate various combinations of a touch screen and a display panel according to an example embodiment of the invention.
Figure 5:
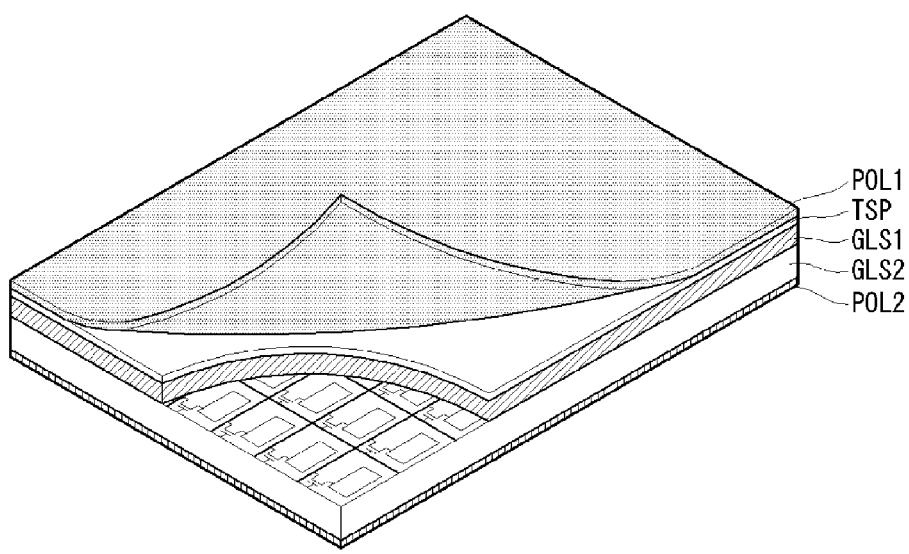
Figure 6:
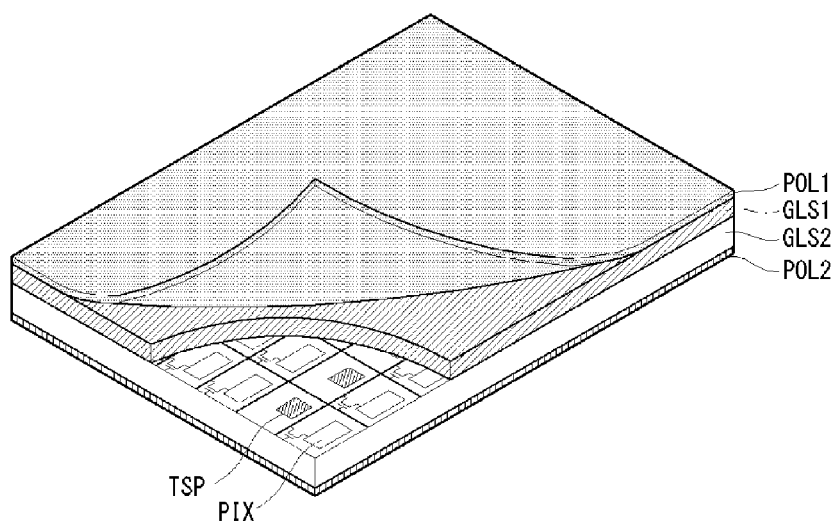

FIG. 2 is a block diagram of a display device according to an example embodiment of the invention. FIG. 3 illustrates a touch screen driver shown in FIG. 2. FIGS. 4 to 6 illustrate various combinations of a touch screen and a display panel.

As shown in FIGS. 2 to 6, a display device according to the embodiment of the invention includes a display panel DIS, a display driving circuit, a timing controller 20, a touch screen TSP, a touch screen driving circuit, a touch controller 30, etc. All components of the display device may be operatively coupled and configured.

The display device according to the embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

The display panel DIS includes a lower substrate GLS2, an upper substrate GLS1, and a liquid crystal layer formed between the lower substrate GLS2 and the upper substrate GLS1. The lower substrate GLS2 of the display panel DIS includes a plurality of data lines D1 to Dm, where m is a natural number, a plurality of gate lines (or scan lines) G1 to Gn crossing the data lines D1 to Dm, where n is a natural number, a plurality of thin film transistors (TFTs) formed at crossings of the data lines D1 to Dm and the gate lines G1 to Gn, a plurality of pixel electrodes for charging liquid crystal cells to a data voltage, a plurality of storage capacitors, each of which is connected to the pixel electrode and holds a voltage of the liquid crystal cell, etc.

Pixels of the display panel DIS are respectively formed in pixel areas defined by the data lines D1 to Dm and the gate lines G1 to Gn to form a matrix structure. The liquid crystal cell of each pixel is driven by an electric field generated based on a difference between the data voltage supplied to the pixel electrode and a common voltage supplied to a common electrode, thereby adjusting an amount of incident light transmitted by the liquid crystal cell. The TFTs are turned on in response to a gate pulse (or a scan pulse) from the gate lines G1 to Gn, thereby supplying the voltage from the data lines D1 to Dm to the pixel electrodes of the liquid crystal cells.

The upper substrate GLS1 of the display panel DIS may include black matrixes, color filters, etc. The lower substrate GLS2 of the display panel DIS may be configured in a COT (color filter on TFT) structure. In this instance, the black matrixes and the color filters may be formed on the lower substrate GLS2 of the display panel DIS.

Polarizing plates POL1 and POL2 are respectively attached to the upper and lower substrates GLS1 and GLS2 of the display panel DIS. Alignment layers for setting a pre-tilt angle of liquid crystals are respectively formed on the inner surfaces contacting the liquid crystals in the upper and lower substrates GLS1 and GLS2 of the display panel DIS. A column spacer may be formed between the upper and lower substrates GLS1 and GLS2 of the display panel DIS to keep cell gaps of the liquid crystal cells constant.

A backlight unit may be disposed on a back surface of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12 and a scan driving circuit 14. The display driving circuit applies a video data voltage of an input image to the pixels of the display panel DIS. The data driving circuit 12 converts digital video data RGB received from the timing controller 20 into positive and negative analog gamma compensation voltages and outputs the data voltage. The data driving circuit 12 then supplies the data voltage to the data lines D1 to Dm. The scan driving circuit 14 sequentially supplies the gate pulse synchronized with the data voltage to the gate lines G1 to Gn and selects lines of the display panel DIS to which the data voltage will be applied.

The timing controller 20 receives timing signals, such as a vertical sync signal Vsync, a horizontal sync signal Hsync, a data enable DE, and a main clock MCLK, from an external host system. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable SOE, a polarity control signal POL, etc. The scan timing control signal includes a gate start pulse GSP, a gate shift clock GSC, a gate output enable GOE, etc.

As shown in FIG. 4, the touch screen TSP may be attached on the upper polarizing plate POL1 of the display panel DIS. Alternatively, as shown in FIG. 5, the touch screen TSP may be formed between the upper polarizing plate POL1 and the upper substrate GLS1. Alternatively, as shown in FIG. 6, sensor nodes TSCAP (refer to FIG. 3) of the touch screen TSP may be formed on the lower substrate GLS2 along with a pixel array of the display panel DIS in an in-cell type. In FIGS. 4 to 6, 'PIX' denotes the pixel electrode of the liquid crystal cell.

The touch screen TSP includes Tx lines T1 to Tj, where j is a positive integer less than n, Rx lines R1 to Ri crossing the Tx lines T1 to Tj, where i is a positive integer less than m, and i×j sensor nodes TSCAP formed at crossings of the Tx lines T1 to Tj and the Rx lines R1 to Ri.

The touch screen driving circuit includes a Tx driving circuit 32 and an Rx driving circuit 34. The touch screen driving circuit supplies a driving pulse to the Tx lines T1 to Tj and senses voltages of the sensor nodes TSCAP through the Rx lines R1 to Ri to convert the sensed voltages of the sensor nodes TSCAP into digital data. The Tx driving circuit 32 and the Rx driving circuit 34 may be integrated in one readout integrated circuit (ROIC).

The Tx driving circuit 32 sets a Tx channel in response to a Tx setup signal SUTx received from the touch controller 30 and supplies the driving pulse to the Tx lines T1 to Tj connected to the set Tx channel. If the j sensor nodes TSCAP are connected to one Tx line, the driving pulse may be successively supplied to the one Tx line j times and then the driving pulse may be successively supplied to a next Tx line in the same manner.

The Rx driving circuit 34 sets Rx channels to receive the voltages of the sensor nodes TSCAP in response to an Rx setup signal SURx received from the touch controller 30 and receives the voltages of the sensor nodes TSCAP through the Rx lines R1 to Ri connected to the set Rx channels. The Rx driving circuit 34 charges a sampling capacitor CS (refer to FIG. 9) to the voltages of the sensor nodes TSCAP in response to Rx sampling clocks SRx of the touch controller 30 and samples the voltages of the sensor nodes TSCAP. The Rx driving circuit 34 converts the sampled voltages of the sensor nodes TSCAP into the digital data (i.e., touch raw data) and transmits the touch raw data to the touch controller 30.

The touch controller 30 is connected to the Tx driving circuit 32 and the Rx driving circuit 34 through an interface, such as I²C bus, a serial peripheral interface (SPI), and a system bus. The touch controller 30 supplies the Tx setup signal SUTx to the Tx driving circuit 32 and sets the Tx channel, to which the driving pulse will be output. Further, the touch controller 30 supplies the Rx setup signal SURx to the Rx driving circuit 34 and selects the Rx channels, in which the voltages of the sensor nodes TSCAP will be read. The touch controller 30 supplies Rx sampling clocks SRx for controlling sampling switches of a sampling circuit embedded in the Rx driving circuit 34 to the Rx driving circuit 34, thereby controlling a voltage sampling timing of the sensor nodes TSCAP. The touch controller 30 differently controls sampling times of the Rx channels in consideration of an RC delay deviation between the Rx channels. The touch controller 30 may differently control on-duties of the Rx sampling clocks SRx of the Rx channels based on the RC delay deviation between the Rx channels, so as to control the sampling times of the Rx channels. Alternatively, the touch controller 30 may equally maintain the on-duties of the Rx sampling clocks SRx and differently control on-period start points of the Rx channels.

Further, the touch controller 30 supplies analog-to-digital conversion clocks to an analog-to-digital converter (ADC) embedded in the Rx driving circuit 34, thereby controlling operation timing of the ADC.

The touch controller 30 analyzes the touch raw data received from the Rx driving circuit 34 using a previously determined touch recognition algorithm. The touch controller 30 estimates coordinate values of the touch raw data, which is equal to or greater than a predetermined reference value, and outputs touch data HIDxy including coordinate information of a touch position. The touch data HIDxy output from the touch controller 30 is transmitted to the external host system. The touch controller 30 may be implemented as a microcontroller unit (MCU).

The host system may be connected to an external video source equipment, for example, a navigation system, a set-top box, a DVD player, a Blu-ray player, a personal computer (PC), a home theater system, a broadcasting receiver, and a phone system and receive image data from the external video source equipment. The host system includes a system on chip (SoC) including a scaler and converts the image data received from the external video source equipment into a format suitable for displaying on the display panel DIS. Further, the host system runs an application associated with coordinate values of the touch data received from the touch controller 30.

Figure 7:
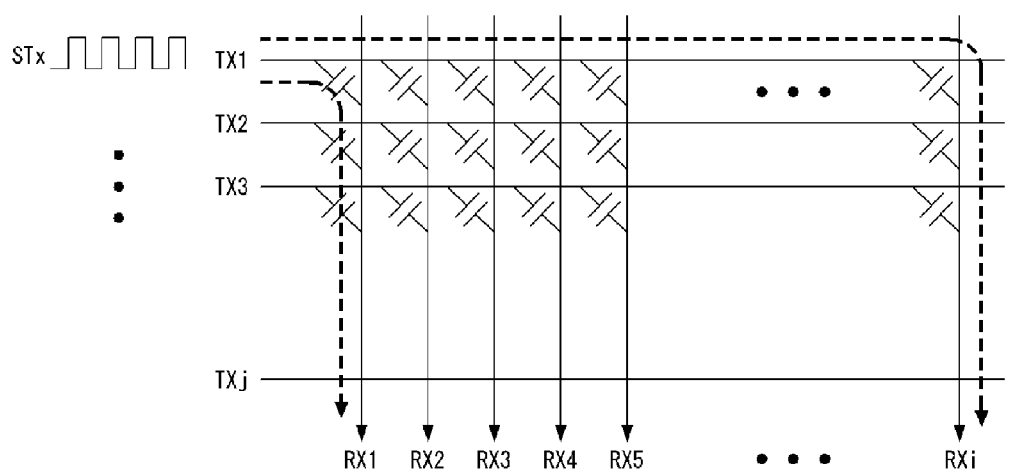
FIG. 7 illustrates that an RC delay difference between Rx channels is generated in a touch screen.
Figure 8:
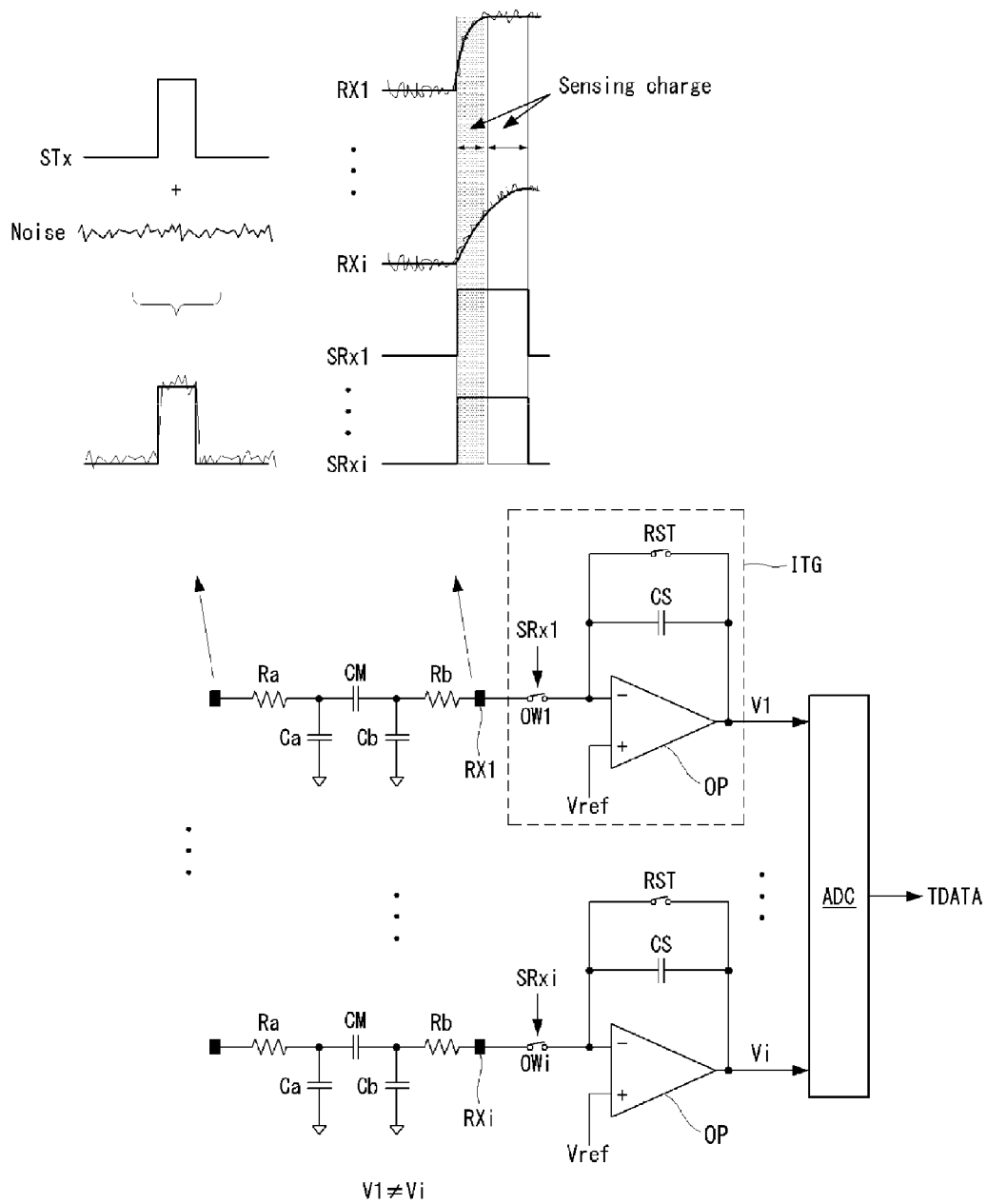
FIG. 8 illustrates that sampling times of Rx channels are the same as one another in spite of a RC delay difference.
Figure 9:
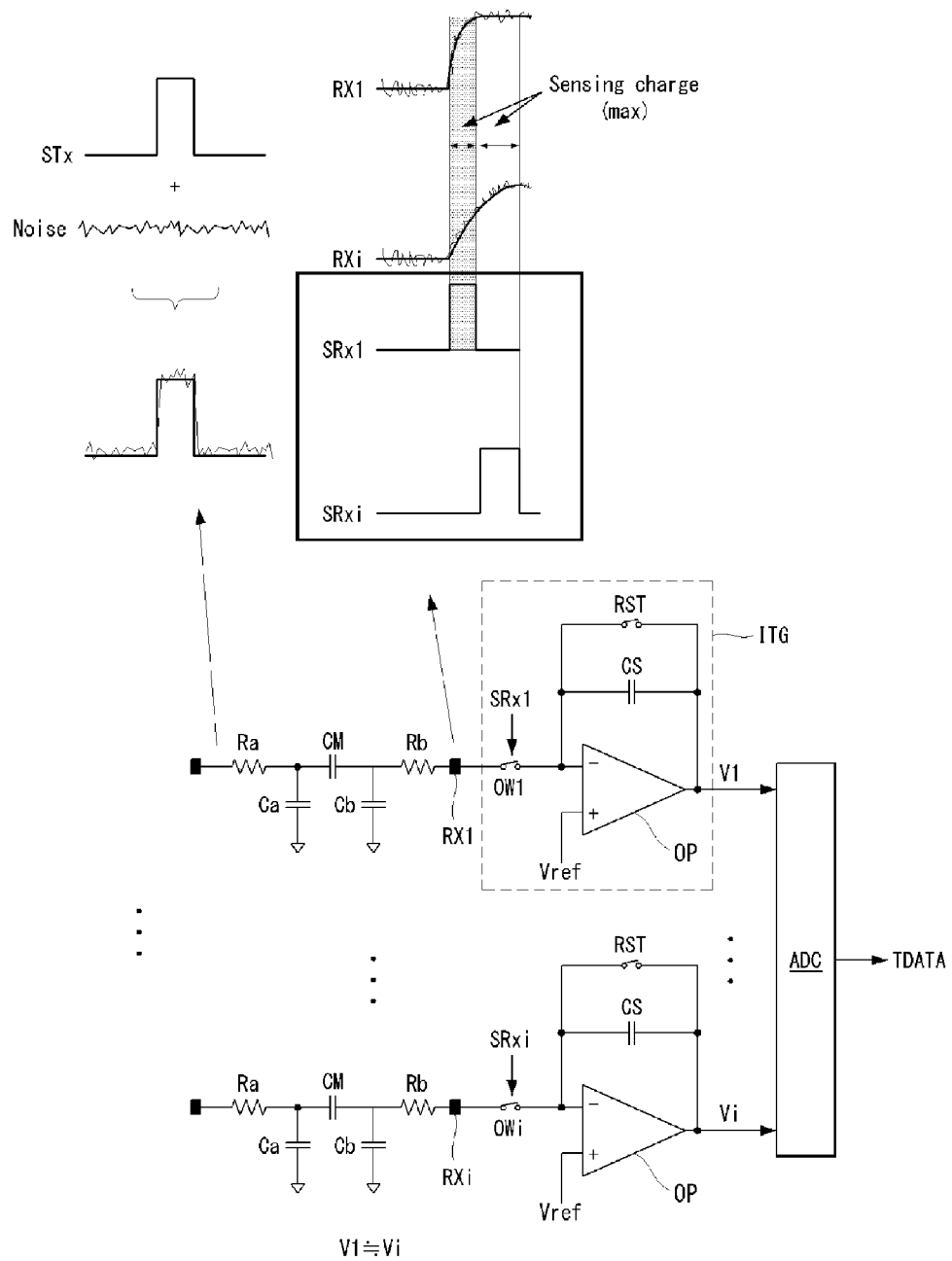
FIG. 9 illustrates that sampling times of Rx channels are different from one another based on a RC delay difference.

FIG. 7 illustrates that an RC delay difference between the Rx channels is generated in the touch screen. FIG. 8 illustrates that sampling times of all the Rx channels are the same as one another in spite of the RC delay difference. FIG. 9 illustrates that sampling times of the Rx channels are different from one another based on the RC delay difference.

As shown in FIGS. 8 and 9, a sampling circuit ITG embedded in the Rx driving circuit 34 includes a sampling switch OW1, a sampling capacitor CS, an operational amplifier OP, a reset switch RST, etc. The sampling circuit ITG is connected to an Rx channel RX1. Each of sampling circuits ITG connected to other Rx channels RX2 to RXi substantially has the same structure as the sampling circuit ITG connected to the Rx channel RX1.

The sampling switch OW1 is connected between the Rx channel RX1 and an inverting input terminal (−) of the operational amplifier OP. The sampling capacitor CS and the reset switch RST are connected in parallel between the inverting input terminal (−) and an output terminal of the operational amplifier OP. A non-inverting input terminal (+) of the operational amplifier OP is connected to a reference voltage source Vref, and the output terminal of the operational amplifier OP is connected to an input terminal of the ADC.

The sampling switches OW1 to OWi respectively connected to the Rx channels RX1 to RXi are turned on or off by Rx sampling clocks SRx1 to SRxi received from the touch controller 30. When the sampling switches OW1 to OWi are turned on, voltages V1 to Vi of the sensor nodes TSCAP received from the Rx channels RX1 to RXi are stored in the sampling capacitors CS. The ADC sequentially converts the voltages V1 to Vi stored in the sampling capacitors CS of the sampling circuits ITG into digital touch data TDATA in each of the analog-to-digital conversion clocks received from the touch controller 30.

In FIGS. 8 and 9, "Ca" denotes a parasitic capacitance connected to the Tx line, "Cb" denotes a parasitic capacitance connected to the Rx line, "Ra" denotes a resistance of the Tx line, "Rb" denotes a resistance of the Rx line, and "CM" denote a mutual capacitance of the sensor node.

As shown in FIG. 7, a driving pulse STx applied to the Tx lines T1 to Tj is noisy, and RC delays of the Rx channels RX1 to RXi are different from one another. Therefore, as shown in FIGS. 8 and 9, transition times of input signals (i.e., the voltages V1 to Vi of the sensor nodes TSCAP) input to the sampling circuits ITG are different from one another in the Rx channels RX1 to RXi. In the embodiment of the invention, the transition time is a time at which the input signal changes from a transition state to a saturation state (i.e., at which the input signal is in a maximum charge state).

As shown in FIG. 8, when the sampling times of all the Rx channels RX1 to RXi are the same as one another through the same Rx sampling clocks SRx1 to SRxi in spite of the RC delay difference, a signal-to-noise ratio (abbreviated to SNR) is reduced because of a sampling deviation (V1≠Vi). Hence, it is difficult to accurately detect a touch signal.

As shown in FIG. 9, the Rx sampling clocks SRx1 to SRxi of the Rx channels RX1 to RXi are differently controlled in consideration of the RC delay deviation, so as to remove the sampling deviation. Hence, turn-on times of the sampling switches OW1 to OWi are adjusted.

FIGS. 10A to 10C and FIG. 11 illustrate examples of adjusting the Rx sampling clocks for controlling the sampling times of the Rx channels.

Figure 10A:
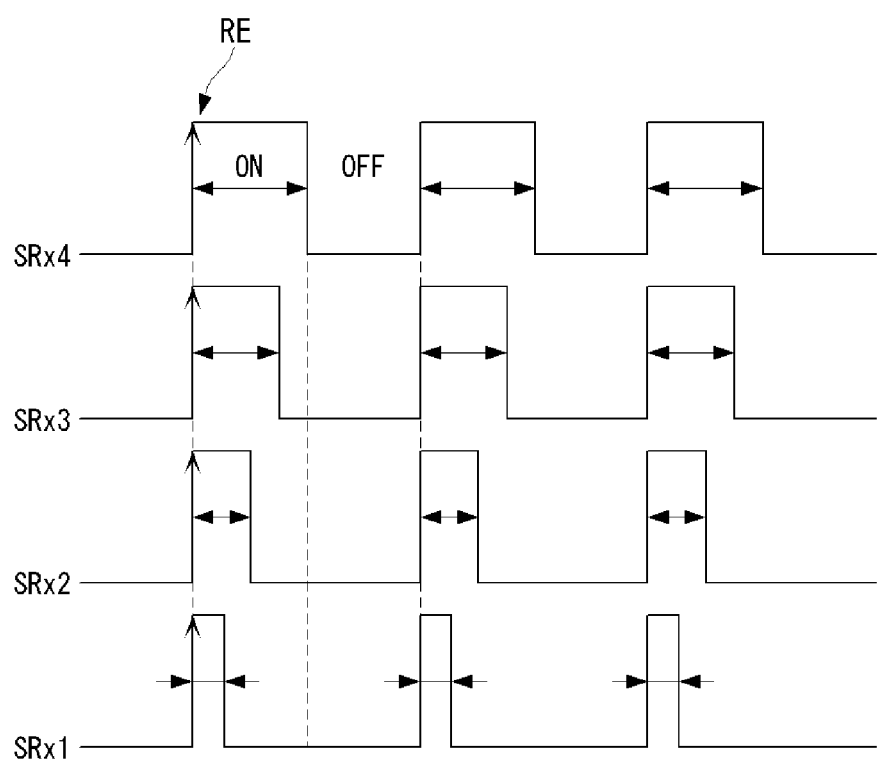
FIGS. 10A to 10C and FIG. 11 illustrate examples of adjusting Rx sampling clocks so as to control sampling times of Rx channels.
Figure 10B:
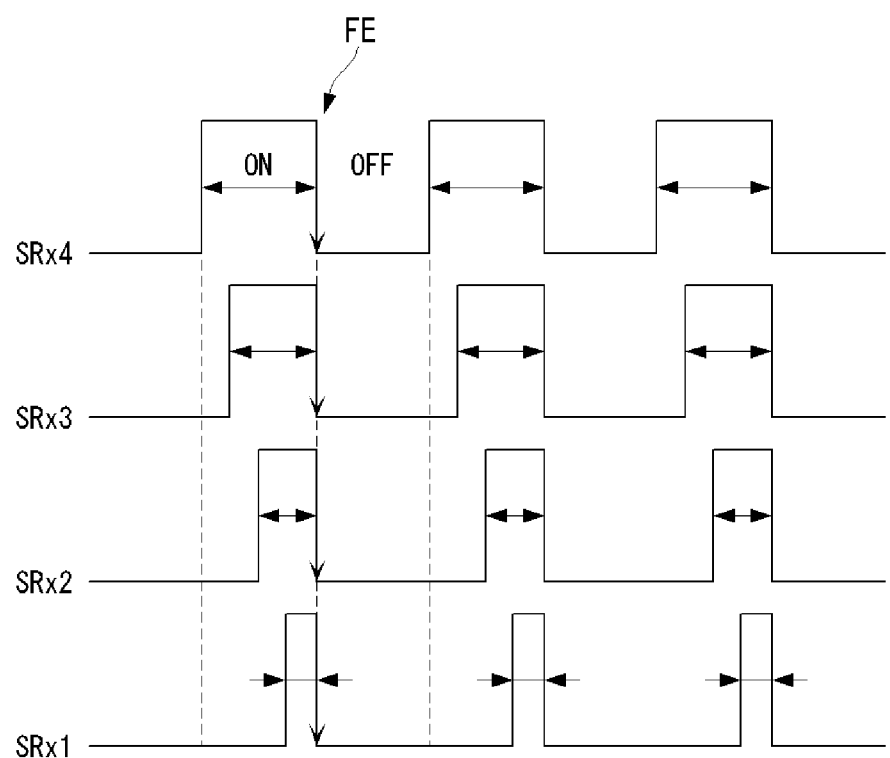
Figure 10C:
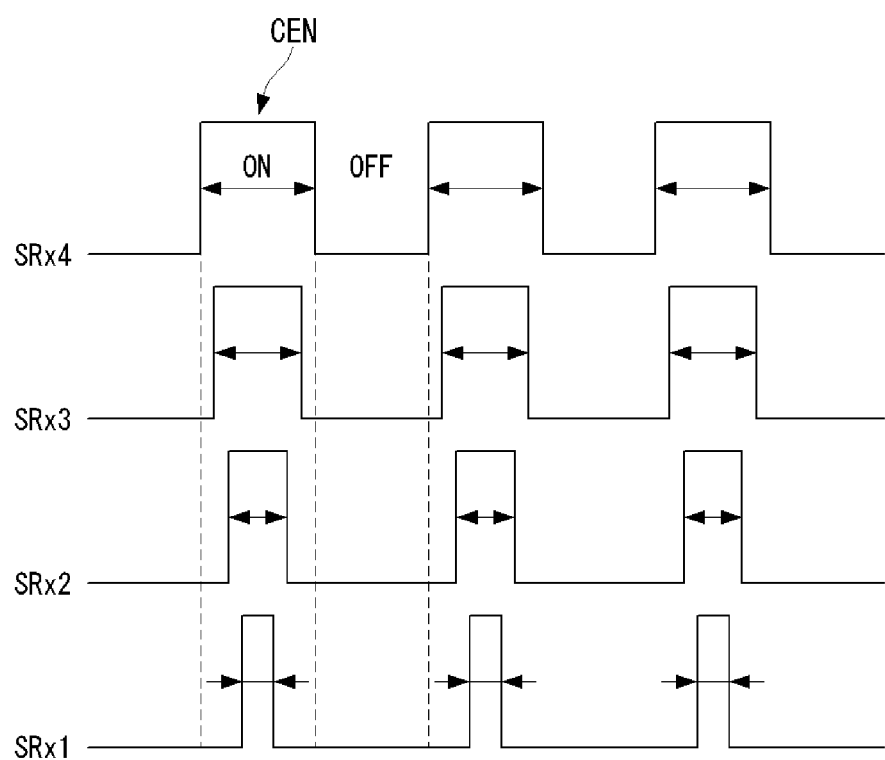

As shown in FIGS. 10A to 10C, the touch controller 30 may differently adjust on-duties of the Rx sampling clocks SRx in the Rx channels based on the RC delay deviation.

The touch controller 30 widens an on-duty of the Rx sampling clock SRx of the Rx channel having a large RC delay rather than the Rx channel having a small RC delay. For example, as shown in FIG. 10A, the touch controller 30 may widen on-duties of the Rx sampling clocks SRx1 to SRx4 in proportion to the RC delay and also may synchronize rising edges RE of the Rx sampling clocks SRx1 to SRx4 with one another. As another example, as shown in FIG. 10B, the touch controller 30 may widen on-duties of the Rx sampling clocks SRx1 to SRx4 in proportion to the RC delay and also may synchronize falling edges FE of the Rx sampling clocks SRx1 to SRx4 with one another. As another example, as shown in FIG. 10C, the touch controller 30 may widen on-duties of the Rx sampling clocks SRx1 to SRx4 in proportion to the RC delay and also may synchronize on-period center points CEN of the Rx sampling clocks SRx1 to SRx4 with one another.

Figure 11:
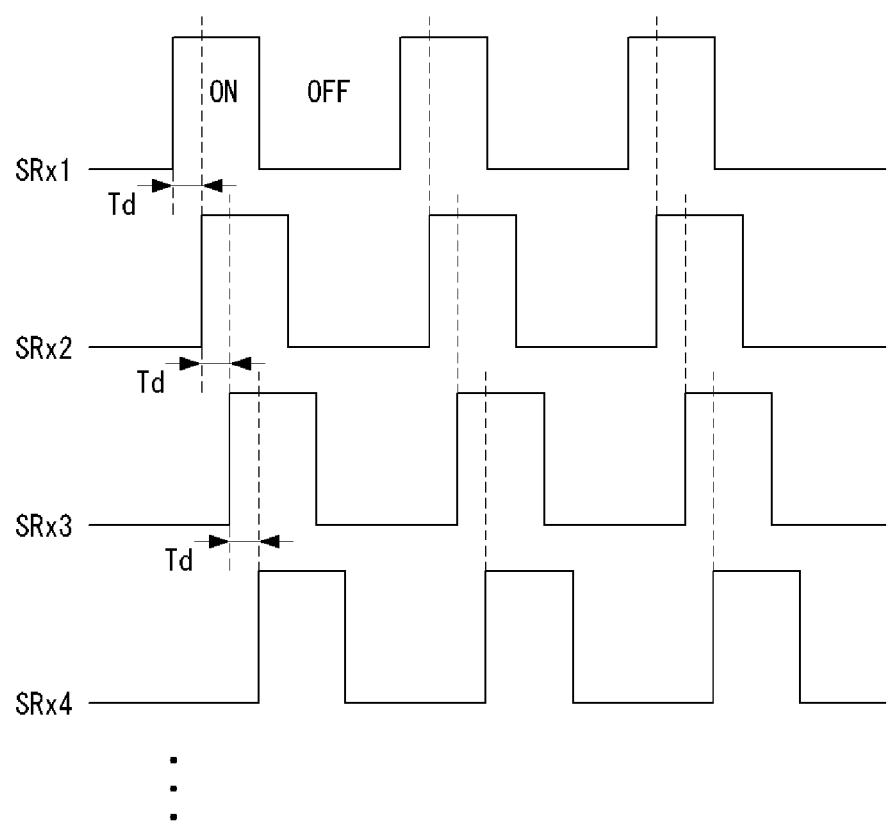

As shown in FIG. 11, the touch controller 30 may equally maintain on-duties of the Rx sampling clocks SRx1 to SRx4 and differently control on-period start points of the Rx sampling clocks SRx1 to SRx4 of the Rx channels based on the RC delay deviation. As an on-period of the Rx sampling clock SRx lengthens, a generation period of a noise lengthens. Therefore, when the Rx sampling clocks SRx1 to SRx4 are sequentially delayed by a predetermined period of time Td based on the RC delay deviation, the mixing of the noise may be efficiently prevented.

Figure 12:
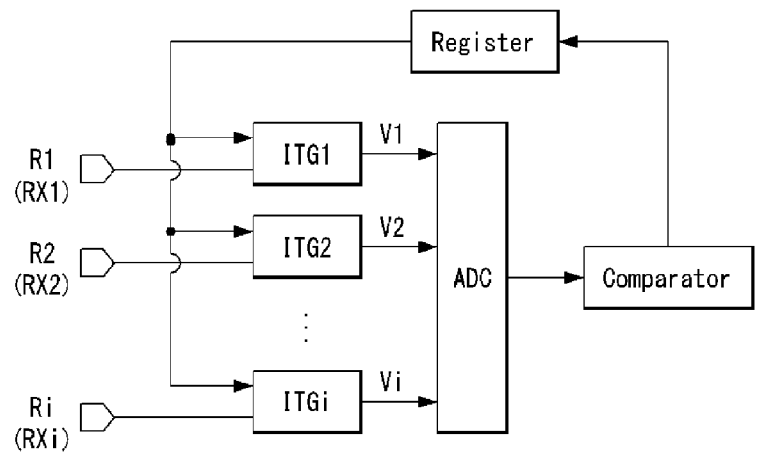
FIGS. 12 and 13 illustrate a control configuration and a control flow for automatically adjusting on-duties of Rx sampling clocks based on a RC delay deviation.
Figure 13:
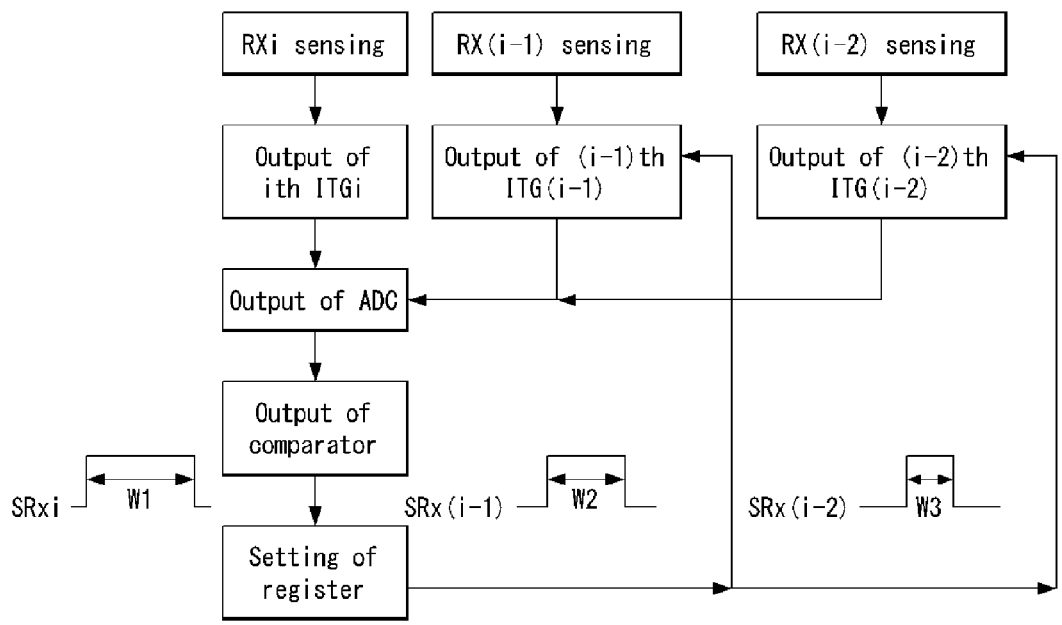

FIGS. 12 and 13 illustrate a control configuration and a control flow for automatically adjusting the on-duties of the Rx sampling clocks based on the RC delay deviation. In FIGS. 12 and 13, it is assumed that an ith Rx channel RXi has a maximum RC delay, an (i−2)th Rx channel RX(i−2) has a minimum RC delay, and an (i−1)th Rx channel RX(i−1) has a middle RC delay between the maximum RC delay and the minimum RC delay. A comparator and a register shown in FIG. 12 may be embedded in the touch controller 30.

As shown in FIGS. 12 and 13, when an output Vi of an ith sampling circuit ITGi connected to the ith Rx channel RXi is input to the comparator through the ADC, the comparator sets a value of the register so that an Rx sampling clock SRxi having an on-duty W1 is generated.

Subsequently, when an output V(i−1) of an (i−1)th sampling circuit ITG(i−1) connected to the (i−1)th Rx channel RX(i−1) is input to the comparator through the ADC, the comparator compares the output Vi of the ith sampling circuit ITGi used as a reference value with the output V(i−1) of the (i−1)th sampling circuit ITG(i−1). Because the RC delay of the (i−1)th Rx channel RX(i−1) is less than the RC delay of the ith Rx channel RXi, the output V(i−1) is greater than the output Vi. The comparator sets a value of the register so that an Rx sampling clock SRx(i−1) having an on-duty W2 (less than the on-duty W1) is generated based on a voltage difference between the output V(i−1) and the output Vi.

Subsequently, when an output V(i−2) of an (i−2)th sampling circuit ITG(i−2) connected to the (i−2)th Rx channel RX(i−2) is input to the comparator through the ADC, the comparator compares the output Vi of the ith sampling circuit ITGi with the output V(i−2) of the (i−2)th sampling circuit ITG(i−2). Because the RC delay of the (i−2)th Rx channel RX(i−2) is less than the RC delay of the ith Rx channel RXi, the output V(i−2) is greater than the output Vi. The comparator sets a value of the register so that an Rx sampling clock SRx(i−2) having an on-duty W3 (less than the on-duty W1) is generated based on a voltage difference between the output V(i−2) and the output Vi.

As described above, the embodiment of the invention differently controls the sampling times of the channels based on the RC delay deviation between the channels, thereby accurately detecting the touch signal and increasing the SNR.

Furthermore, the embodiment of the invention may uniformly and accurately extract the touch data in the entire area of the touch screen. Therefore, a touch resolution and the touch accuracy may be improved.

Furthermore, because the embodiment of the invention may adjust the sampling times of the channels in conformity with the Tx driving pulse, the embodiment of the invention may adjust the frequency of the Tx drive, thereby contributing to a reduction in the power of the entire circuit.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen driver, comprising:
a touch screen including:
transmission (Tx) channels;
receiving (Rx) channels crossing the Tx channels; and
sensor nodes formed at crossings of the Tx channels and the Rx channels;
a Tx driving circuit configured to supply a driving pulse to the Tx channels;
an Rx driving circuit configured to:
sample voltages of the sensor nodes supplied through the Rx channels in response to Rx sampling clocks; and
convert the sampled voltages of the sensor nodes into digital data; and
a touch controller configured to:
modulate the Rx sampling clocks based on an RC delay deviation between the Rx channels;
supply the modulated Rx sampling clocks to the Rx driving circuit;
differently control sampling times of the Rx channels;
analyze the digital data received from the Rx driving circuit using a previously determined touch recognition algorithm;
output touch data including coordinate information of a touch position;
further widen an on-duty of an Rx sampling clock of an Rx channel having a large RC delay, rather than an Rx channel having a small RC delay; and
synchronize rising edges of the Rx sampling clocks of the Rx channels, falling edges of the Rx sampling clocks of the Rx channels, or on-period center points of the Rx sampling clocks of the Rx channels.

2. The touch screen driver of claim 1, wherein the touch controller is further configured to differently control on-duties of the Rx sampling clocks of the Rx channels based on the RC delay deviation.

3. The touch screen driver of claim 1, wherein the touch controller is further configured to differently control on-period start points of the Rx sampling clocks of the Rx channels based on the RC delay deviation.

4. A method for driving a touch screen including transmission (Tx) channels, receiving (Rx) channels crossing the Tx channels, and sensor nodes formed at crossings of the Tx channels and the Rx channels, the method comprising:
supplying a driving pulse to the Tx channels;
modulating Rx sampling clocks to differently control sampling times of the Rx channels based on an RC delay deviation between the Rx channels;
sampling voltages of the sensor nodes supplied through the Rx channels in response to the Rx sampling clocks;
converting the sampled voltages of the sensor nodes into digital data; and
analyzing the digital data using a previously determined touch recognition algorithm to output touch data including coordinate information of a touch position, wherein the modulating of the Rx sampling clocks includes further widening an on-duty of an Rx sampling clock of an Rx channel having a large RC delay, rather than an Rx channel having a small RC delay, and wherein the modulating of the Rx sampling clocks includes synchronizing rising edges of the Rx sampling clocks of the Rx channels, falling edges of the Rx sampling clocks of the Rx channels, or on-period center points of the Rx sampling clocks of the Rx channels.

5. The method of claim 4, wherein the modulating of the Rx sampling clocks includes differently controlling on-duties of the Rx sampling clocks of the Rx channels based on the RC delay deviation.

6. The method of claim 4, wherein the modulating of the Rx sampling clocks includes differently controlling on-period start points of the Rx sampling clocks of the Rx channels based on the RC delay deviation.

* * * * *